Patented Apr. 8, 1952

2,592,132

UNITED STATES PATENT OFFICE 2,592,132

LIQUID FUEL SUPPLY AND CONTROL SYSTEM FOR ATOMIZING NOZZLES

Geoffrey Bertram Robert Feilden, Lutterworth, near Rugby, and Archie Simons and Raymond Holl, Leicester, England, assignors to Power Jets (Research & Development) Limited, London, England Application June 6, 1945, Serial No. 597,912
In Great Britain June 8, 1944

12 Claims. (Cl. 158—36)

This invention relates to fuel supply and control systems, in which a burner or burners or the equivalent, are required to be supplied with fuel under pressure, and in which the rate of delivery is to be controlled. An example of such a case is to be found in a gas turbine aero engine of the kind comprising a compressor which supplies air to a combustion system in which liquid fuel is burned, the resultant energised gaseous mixture driving a gas turbine of which a part of the whole shaft power output is used to drive the compressor whilst the residual energy of the exhaust gases is utilised to produce propulsive thrust. Such engines adjust their fuel/air ratio automatically and are consequently controllable by regulation of the rate of fuel supply which, however, must consequently take into account variations in the density of the aspirated air to ensure constant engine speed despite such variations, due, for example, to change in height or barometer.

In such case the burners are arranged to be supplied "in parallel" by a pressure source, usually involving a fuel pump, and the output of the burners and therefore the power delivery of the engine, is to be controlled by the operator, and also or alternatively by automatic means which may comprise a speed governor, and in aircraft installations a "barostat" which is the name given to a device which is responsive to the ambient pressure and which in responding, takes part in the control of the fuel supply so as to suit the supply to the barometric height. The main object of the invention is to provide a fuel and control system which is adapted to the requirements of a certain type of burner, and in being so adapted, has advantages of simplicity, reliability, and precision of operation, with a minimum of difficulty in matching a set of burners or obtaining reproducibility in burners.

The invention seeks to provide ordinary running control in a simple manner and also to provide for governing in respect of speed and altitude, a wide range of speed control, and a fuel system whereby, contrary to the complicated controls in an ordinary aero-engine installation, the pilot has only one control by means of which engine speed and consequently propulsive thrust can be varied, and is under no necessity of observing instruments closely.

Engines of the kind stated have certain fairly well defined idling speeds below which they are not satisfactorily self driving. The starting procedure therefore involves rotating the turbine and compressor to a comparatively low speed to induce a flow of air through the engine, supplying fuel in a suitable condition, igniting the fuel-air mixture, and increasing the engine speed until the engine becomes self driving and controllable. The invention seeks to conform with this starting procedure and to take into account this and other requirements.

Fuel is delivered into the engine prior to combustion by burners having a pressure/flow characteristic operating over a range conforming to engine performance and the present invention is intended to be particularly applicable to the case when the burners used are of the spill controlled kind as described in now abandoned co-pending application No. 597,807 (Simons) dated June 6, 1945 entitled "Improvements Relating to Apparatus for Delivering Liquids and Supply Systems Therefor," said application having a common assignee with the present application, and now abandoned. Such burners which may at the same time also be centrifugal or "swirl" type, i. e. may be provided with means such as a swirl chamber wherein the fuel is swirled rapidly before issuing from the nozzle, are supplied with fuel at a rate determined in the first instance by the output of a pump or the like, and they have a spillway or outlet which preferably leads away from the swirl chamber coaxially, and which returns surplus fuel to the source, this outlet leading through a controlled restriction such that when the restriction is relieved (opened) the burner reduces its output (because its output is due to lower effective spill pressure) and conversely when the restriction is intensified (closed), the burner output is correspondingly increased. The device is known as a "spill-controlled burner."

A further device with which the present invention can advantageously be associated is known as a "dual fuel pump" system and is described in co-pending application No. 591,750 (Walter et al.) dated May 3, 1945 entitled "Improved Pressure Liquid Supply System" said application having a common assignee with the present application.

In this, as applied to gas-turbine installations, at least two fuel pumps are provided which may be driven by the engine and are of a substantially positive displacement type. At low engine speeds (when the demand is for high delivery at relatively high pressure) the two pumps operate in parallel, but at higher speeds one pump takes over the whole load while the other is then idling. The pumps may be supplemented by a third pump utilised in starting and in that case preferably driven by a starting motor. The operation of the pumps, particularly for starting, may also be supplemented by the provision of a pressure accumulator.

Yet another device with which the invention is involved in preferred embodiments, is the "barostat" are barometrically controlled relief valve described in co-pending application No. 597,810 (Walker et al.) dated June 6, 1945 entitled "Control Device," said application having a common assignee with the present application, in which a relief valve of a fuel supply system is more or less heavily loaded, through servo-pressure means, in accordance with the ambient pressure to which the rate of fuel supply is required to be related, a barometric capsule controlling the servo-means.

A still further device with which the system of the present invention may advantageously be associated is the "dump" valve device described in co-pending application No. 597,911 (Feilden) dated June 6, 1945 entitled "Fuel Systems for Compressor Gas Turbine Plants," said application having a common assignee with the present application, whereby when the fuel supply pressure falls below a selected minimum, all the fuel in the system downstream of the "dump" valve is "dumped" outside the system through a drain.

According to a feature of this invention, a fuel supply and control system including one or more preferably swirl-type spill-controlled burners, is provided on the spill side of the burner or burners with valve means to create greater or less resistance to flow from the burners in accordance with at least two functions one of which is the operator's control and the other of which is automatically applied control. The automatic control may be the action of a "barostat," or the action of a speed-sensitive governor, or in some circumstances both actions may be involved as the automatic function.

In addition to the elements above set out there is preferably provided a stop cock, closing of which prevents any fuel from reaching the engine; and there may be non-return or check valves suitably located in the system to determine minimum pressures at which fuel will flow, and also to keep pipelines full.

In order that the invention may be better understood the following describes by way of example, a practical embodiment of it, together with mention of various possible alternatives or elaborations:

The drawings herewith show, in

The main fuel pump 1 is driven by the engine, and is preferably a simple gear-type pump. It is supplied from a fuel tank (not shown) and delivers fuel by the main pressure pipe 3, through a high-pressure filter 3A, through manual high-pressure stop-cock 6 and dump valve 7 to a manifold ring 8 from which branch the fuel burners 9.

These burners 9 are, as previously mentioned, of the type shown as spill controlled, i. e. part of the fuel is spilled back through individual spillways each connected to a spill manifold 8A and thence back to the supply tank through pipe 8B, non-return valve 13, pipe 10A, a bottle valve 10 and spill pipe 11. Opening throttle 4 increases the spill and thus decreases the output of burners 9, and vice versa.

According to a preferred embodiment of the invention the spill control valve 10 is unified with a "barostat," i. e. a barometrically controlled relief valve wherein, as will be described hereinunder, the relief valve loading is varied with ambient pressure so that lowered pressure causes an increase in spill and correspondingly less flow through the burners 9, thus obviating any necessity for the pilot to adjust the throttle to maintain constant engine speed during ambient pressure variation due to change either in altitude or in barometer at constant altitude. In parallel with the pump 1 is a supplementary pump circuit, comprising a feed branch 12A, pressure branch 12B, and pump 12 driven by the engine starter-motor indicated at 12C. In the branch 12B is a non-return valve indicated at 12D.

The maximum pressure of fuel entering the system is limited by non-return valve 3C, controlling a pipe 3B leading back from between the filter 3A and stopcock 6 to spill pipe 11 and thence to the supply tank.

The maximum restriction that can be placed on the spill from the burners by the throttle 10 is limited by an overspeed governor 5 arranged in parallel with the throttle 10.

The dump valve 7 is provided with a drain connection 7A and also communicates through pipe 7B with spill pipe 8B.

The system of Fig. 1 thus outlined operates as follows. It is presupposed that the burners 9 deliver fuel for combustion into the engine, at a rate proportional to the fuel pressure applied to them.

To start the engine the cock 6 is opened and the starter-motor 12C is energised. The engine is thus accelerated from rest, and the pumps 12 and 1 are driven. It is not economical to make pump 1 sufficiently large in capacity, or to arrange its gear ratio with the engine, in such a way that its output in pressure and rate is adequate for starting, hence the provision of pump 12. At starting therefore it can be assumed that pump 12 is the mainly-operative source of fuel. It draws fuel by 12A, and delivers it into pipe 3 via 12B so long as the motor 12C is running. This fuel flows by pipe 3, to the valve 7 (to be mentioned) and thence to the burners 9. Simultaneously, suitable igniting means in the engine start the required combustion. The engine being further accelerated partly by the motor 12C and increasingly by its own power, the pump 1 begins to be operative and quickly raises the fuel pressure in pipe 3. When this pressure exceeds that due to pump 12, the non-return valve 12D closes, and matters are so timed that in this phase of operation the motor 12C is cut out so that pump 12 stops, and the engine is now self-driving on the pump 1.

To stop the engine all that is required is to shut off the cock 6. When this is done, the valve 7 connects the burner-manifold 8 and spill manifold 8A to atmosphere so that it drains, and moreover any air pressure in the engine, to which the burners are exposed, tends to blow back through the burners and out of valve 7, preventing dribbling of the burners and emptying the manifold 8 which is found to be good practice.

The valve 7, which is called a dump-valve because it "dumps" unwanted fuel accumulation to waste, is a change-over valve operated by pressure in the pipe 3, and is described in co-pending application No. 597,911 aforesaid.

Figure 5:
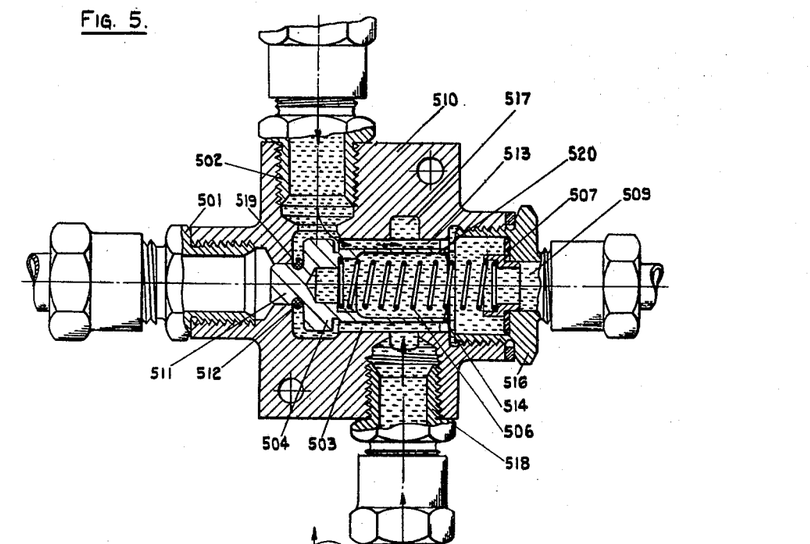
Figs. 5 and 5A sectional views of a "dump" valve.
Figure 5A:
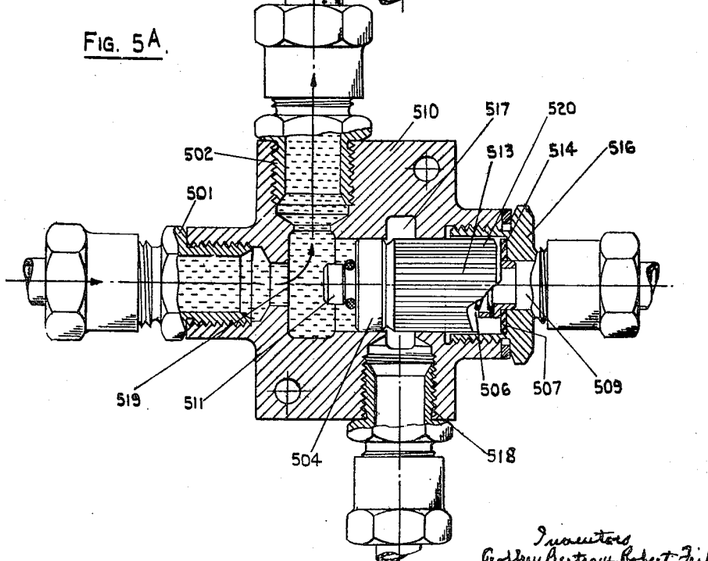

This valve is also shown in Figs. 5 and 5A, the former being in closed position of the supply and open position of the drain and the latter in open position of the supply and closed position of the drain. Referring to both these figures, a body 510 is provided at one end with a union 501 for entry of fuel and at the other end with a screw cap 516 providing a connection to drain 509. A lateral union 502 leads the fuel to delivery and a further lateral union 518 is intended for connection with the spill pipe (8A, 8B, 7B of Fig. 1).

A valve element 504 provided with a nose portion 511 and a hollow cylindrical skirt 520 fluted at 513 slides as a close fit in a cylindrical bore 503 in the body 510. The nose 511 is surrounded by an annular resilient sealing member 512 adapted to seal the valve element 504 against a valve seat 519 in the body 510, under the influence of a spring 506 disposed within the skirt 520 of valve element 504, as shown in Fig. 5.

The end 514 of the skirt 520 is adapted when in the position of Fig. 5A to abut and seal against a resilient annular sealing member 507.

The strength of spring 506 is chosen such that when the fuel supply pressure is below a preselected value the said spring closes the sealing member 512 against seat 519 (as in Fig. 5) and in this position the union 502 is in communication through fluting 513 with drain 509, while at the same time union 518 is also in communication with said drain through annular chamber 517 and fluting 513. When, however, the fuel supply pressure exceeds the pre-selected value, valve element 504 is moved to the position shown in Fig. 5A in which case fuel is transmitted to the delivery point through union 502 while the drain is cut off from union 502 and union 518. Thus when there is operative pressure in pipe 3 downstream of cock 6, valve 7 connects pipe 3 to supply manifold 8 but when this pressure ceases, said valve opens supply manifold 8 and spill manifold 8A to drain.

Reverting now to the condition when the engine is running at idling speed, if the throttle at 4 be closed the burner pressure is increased beyond that corresponding to idling, and consequently the rate of fuel supply is increased and the engine accelerates, until a new speed is reached when the mixture strength of the engine is again stabilised (corresponding to the new throttle setting). Since the pump 1 is selected and geared to deliver fuel at a higher rate than the corresponding engine demand, a proportion of the fuel pumped passes by 3B and returns to the supply tank by pipe 11.

Figures 1, 1A, 1B:
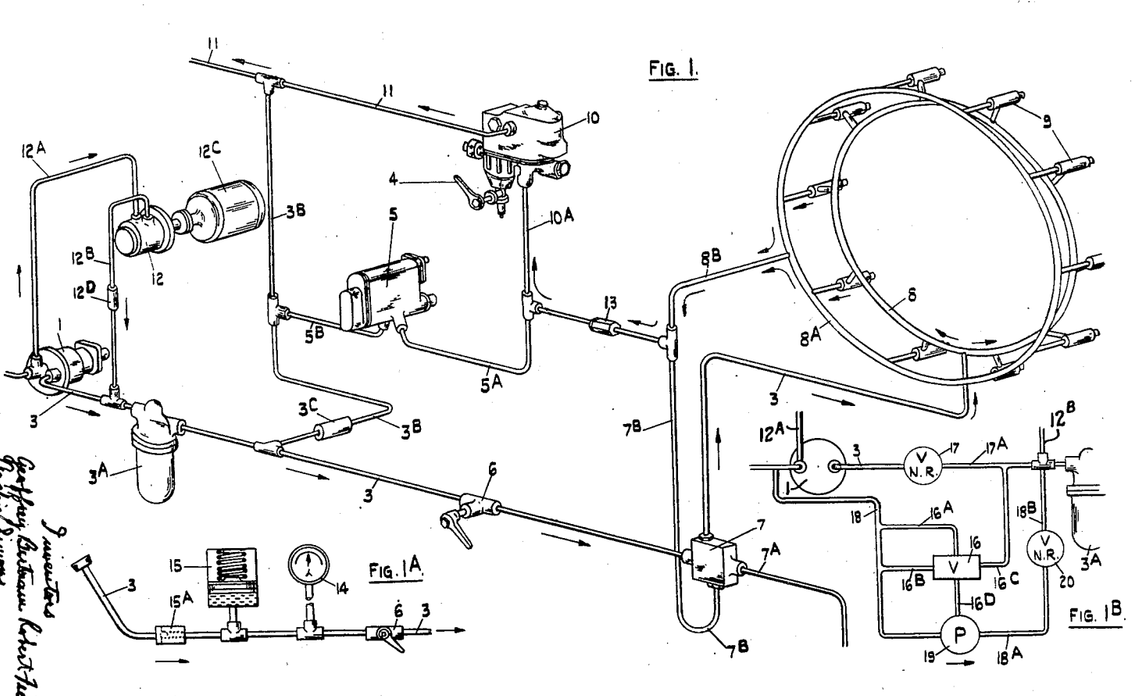
Fig. 1 a diagram of fuel system according to the invention.
Fig. 1A an alternative of one part of this.
Fig. 1B an alternative of another part.

The device of Fig. 1A can be employed as a substitute for the pump 12. Where it is used, the starting procedure is as follows. The motor 12C is energised and output of pump 1 then charges the accumulator 15. Thereafter the cock 6 is opened, and the contents of the accumulator 15, under its pressure, pass to the burners 9, the initial "burst" of pressure being adequate to ensure atomising of fuel and starting conditions generally. Meanwhile the pump 1 is of course still delivering, and the engine will accelerate to idling speed as required. Upon stopping by closing the cock 6, the pressure in the accumulator which can be assumed to be above the maximum required for starting, will remain "stored" because of the closing of the non-return valve 15A, and subject to drop by leakage is available for the next start. The spring or elastic medium in the accumulator may be selected to afford an appropriate rate.

The system of Fig. 1B may be inserted before filter 3A. Pump 19 is arranged to be driven simultaneously with pump 1 and is connected with pipe 3 by pipes 18, 18A, 18B so as to operate in parallel with pump 1 through pipes 18, 18A, non-return valve 20 and pipe 18B when a change-over valve 16 is closed. These conditions exist at starting when the fuel pressure is too low to open valve 16. Valve 16 has a piston type valve element which is actuated against the action of a spring by pressure fluid admitted through pipe 16C (i. e. in accordance with the output of pump 1). When the fuel pressure in 17A exceeds a pre-selected value, valve 16 opens and pump 19 then circulates fuel idly through pipes 16D, valve 16 and pipe 16A, 16B acting as a drain and pump 1 taking the whole load. If the latter pump fails, valve 16 again closes and pump 19 then takes over the whole load, a non-return valve 17 ensuring that supply will be in the required direction. This arrangement may be used together with the boost pump 12, or if desired, the said pump 12 may be dispensed with since pump 19 now serves as an additional starting pump. The system of pumps 1 and 19 connected so as to operate either in parallel or singly according to circumstances is termed a "dual fuel pump" and is described in co-pending application No. 591,750 aforesaid.

The general operation of the system having been described, we shall now show how the more important components are made and operated.

Figure 2:
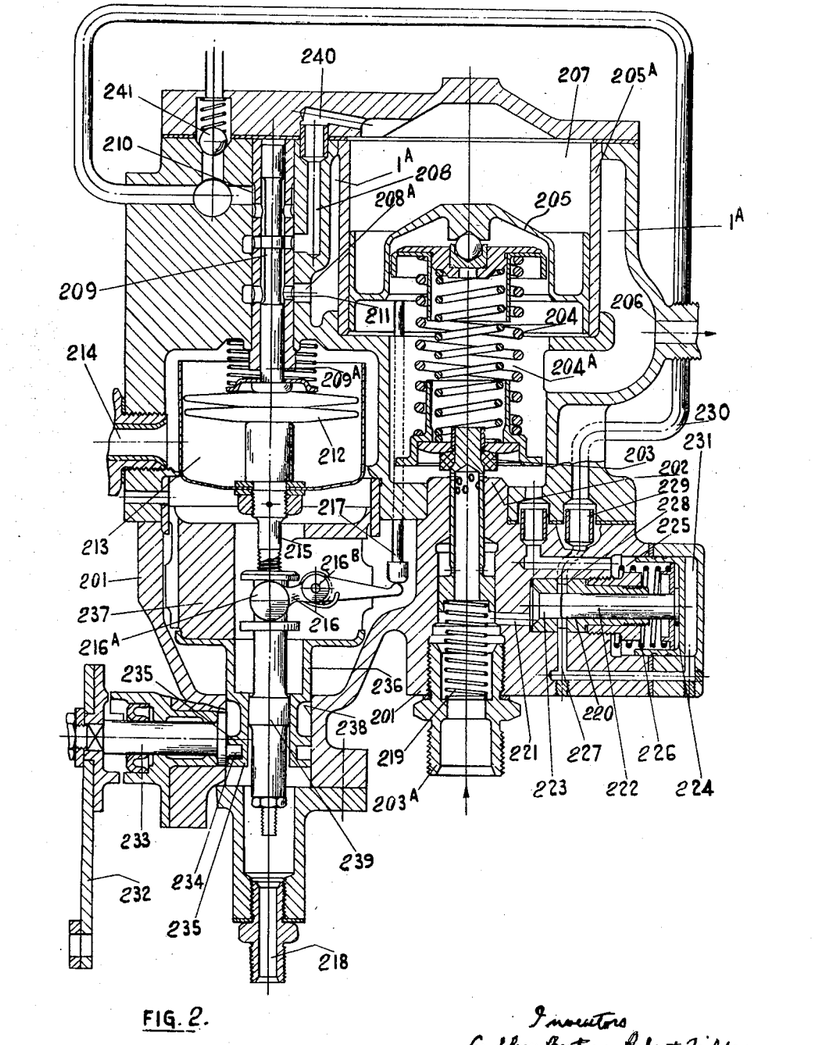
Fig. 2 a sectional view of the barometically controlled relief valve.

Fig. 2 shows the combined throttle and "barostat" relief valve at 10 in Fig. 1. The "barostat" itself as described in copending application No. 598,810 aforesaid is a servo operated device using pressure fluid as its servo medium which in the present case is the fuel itself. Basically this piece of apparatus comprises a casing 201 having a chamber with a fluid inlet 203A and outlet 206 which are coupled respectively (see Figure 1) to the spill pipes 10A, 11; a valve 203 which controls the flow from 203A to 206; and a servo system controlling the valve 203 which comprises a fluid-operated piston 205 balanced by springs 204 opposing the pressure of fluid whose admission to and discharge from the upper side of the piston is controlled by a servo piston valve 209A having a follow-up connection with the piston 205 through a rocker arm 216 and rod 217. The servo fluid used in this system is taken from the main fuel flow between 203A and 206 through a reducing valve 220 which also operates to maintain the pressure of the servo fluid between predetermined limits. The servo valve 209A has barometric compensation through a barometric capsule 212. The detailed construction and operation of the "barostat" will be more clearly understood from the following description.

The relief valve unit casing 201 has a relief valve 203 urged towards its seat 202 by a spring pack 204 set to give the required rate and acting on the under side of piston 205 slidable over the wall 205A of chamber 207. Spilled fuel enters the unit through union 203A and passes to the supply tank through union 206 and pipe 11 (Fig. 1).

The relief valve 203 is initially held open by the spring 219, thus giving no spill pressure which is the best condition for starting. As the speed of the engine increases, the spill pressure (and hence the servo fluid pressure) ceases to be negligible. The main piston 205 then moves slowly down, gradually loading the relief valve 203 until the follow up mechanism 217, 216 moves servo piston 209 to the neutral position. This is then the present idling condition, speed adjustment being obtained by moving the fulcrum 216B as will be hereinunder described.

The reducing valve 220 in the unit comprises a piston 222 movable in a bore 223 and rigid with a base plate 224 slidable in a chamber 225 under the action of spring 226 which tends to cause piston 222 to open passages 227, 228. Fuel to be by-passed to the servo system enters valve 220 through passage 221, and in the position shown, part of said fluid enters passage 227 and the remainder flows into passage 228, thence into chamber 229 and through pipe 230 to passage 210 which serves for the admission of servo fluid to slide valve 209. Passage 208 communicates with chamber 207 through chamber 240.

Spring 226 is set so that if the pressure of the servo-fluid fuel exceeds a pre-selected value, that part of the fuel which enters passage 227 and which also enters space 231 overcomes spring 226 to cause piston 222 to close passages 227, 228, thus reducing the pressure of the servo fluid fuel.

The load of spring pack 204 on valve 203 depends on the position of piston 205. Servo fluid pressure acts in space 207 which communicates via duct 208 either with supply port 210 or with relief port 208A as determined by slide valve 209 which either admits servo fluid (through passages 210, 208) to space 207 or allows it to be emitted from said space through passages 208, 211, 208A. Preferably when valve 209 is balanced, it permits a small flow from 210 to 211, as described below.

In order to compensate, in the setting of valve 209, for variation of atmospheric pressure, stem 209A of valve 209 is moved by deformation of evacuated barometric capsules 212 reacting to ambient pressure in chamber 213 through vent 214 which is suitably protected against ingress of foreign matter. Barometric capsules 212 are mounted on guide rod 215 engaged by a forked end 216A of a rocker 216 borne at 216B and acted on by rod 217 slidable in body 201, the upper end of rod 217 abutting against piston 205. The rod and rocker mechanism acts as a follow up device. If expansion of capsules 212 lifts valve 209 causing servo fluid to flow from space 207, piston 205 rises (by influence of spring pack 204) reducing pressure required to open valve 203 and rod 217 also rises, lowering the bottom of capsules 212. This procedure follows when ambient pressure in chamber 213 drops, i. e. with increased altitude or decrease of forward speed when Pitot pressure is a factor of ambient pressure. The result in the fuel system is to reduce the spill pressure, thus increasing the amount of fuel spilled and reducing fuel supply to the burners.

According to one feature of the present invention, the position of fulcrum 216B is adapted to be manually adjustable to enable the device to act as a throttle valve. For this purpose a throttle lever 232 rigid with spindle 233 moves an eccentric pin 234 arranged between two flanges 235 of a sleeve 236 rigid with a movable block 237 slidably guided in the casing 201, said flanges 235 being also slidable within the neck 238 of casing 201. Sleeve 236 is slidable relative to rod 239 and its movement thus bodily displaces fulcrum 216B.

The position of rod 217 being determined by that of piston 205, movement of fulcrum 216B produces rotation of rocker 216 to re-set valve 209. Thus, to reduce engine speed lever 232 is rotated to move pin 234 upwards thus moving block 237 upwards carrying fulcrum 216B upwards also and causing rocker 216 to pivot clockwise and raise valve 209. This relieves the fluid pressure on piston 205 and permits valve 203 to move upwards, thereby decreasing spill pressure and causing the amount of fuel spilled to increase and so reducing burner output and engine speed.

A relief valve 241 is provided to allow for the case when valve 220 fails and no fuel is being used.

Figure 3:
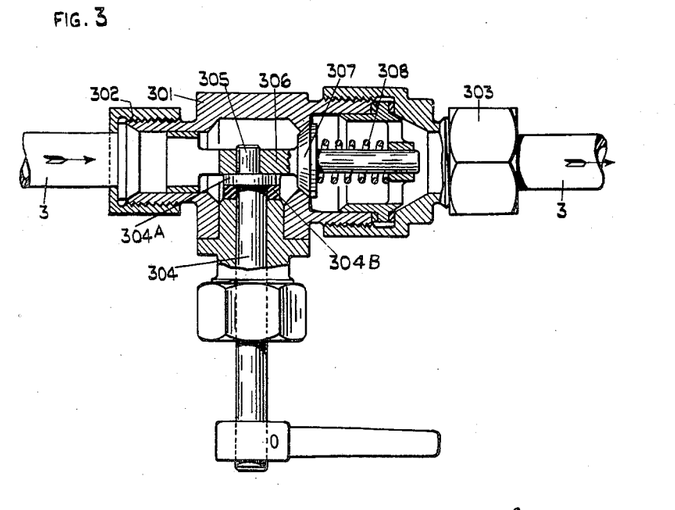
Fig. 3 a sectional view of a stop-cock.

Fig. 3 represents a suitable form for the stopcock 6 indicated in Fig. 1. The body structure 301 has an inlet union 302 and outlet 303. An operating spindle 304 passes into the body and has a flange at 304A, between which flange and a seat in the body 301 is a synthetic rubber washer 304B, for sealing purposes. The spindle 304 also has an eccentric pin 305 formed on its inner end, and this engages a transverse slot in a valve stem 306 which is guided in suitable bores in the body 301. The stem carries a valve head 307 co-operating with a seat in the body, and preferably urged towards this seat by a spring 308. When the spindle 304 is appropriately partially rotated, the valve is opened and contrarotation closes it. It is found that such a cock is well suited to the relatively high pressures of fuel used and requires only a comparatively low torque for its operation. It is described because no ordinary types of commercial cock over a fairly wide range tested, has been found to give as satisfactory a result.

Figure 4:
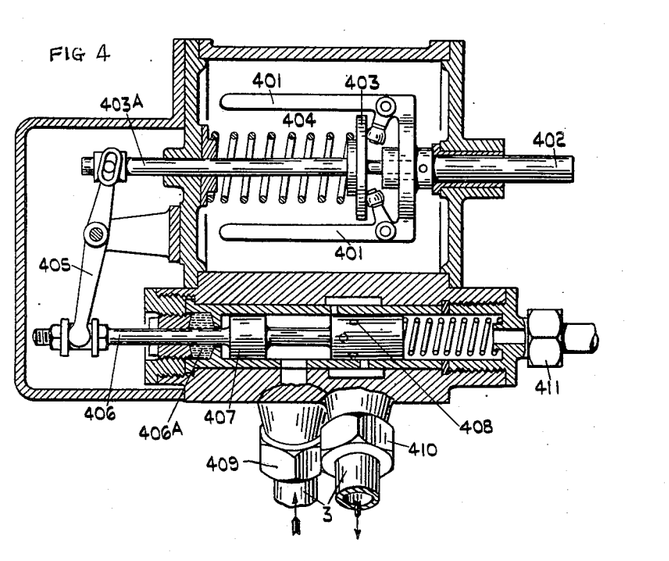
Fig. 4 a sectional view of a speed governor.

Fig. 4 shows diagrammatically a type of governor which may be used at 5 in Fig. 1, considerably simplified for ease of functional description. A system of flyweights 401 is whirled by an engine-driven spindle 402 and under centrifugal influence urges a collar 403 axially against a spring 404, which in practice is adjustable or selected for a chosen speed of operation. The collar 403 on a rod 403A, causes this rod to move axially under governor operation, thus rocking a rocker 405 which in turn actuates (by a stem 406) a slide valve 407 which is a pressure-balanced valve controlling the effective opening of a series of fuel ports 408 which interconnect an inlet union 409 and outlet 410. The ports 408 are staggered axially and their zones of effectiveness overlap slightly in this sense. Operation of the governor causes the balanced valve to uncover the fuel ports 408 thereby allowing fuel to pass through the governor and increase the spill. In practice the gland 406A of the stem 406, is replaced by a series of elastic or pliable diaphragms, to avoid frictional effects which militate against accurate governing. A drain union is provided at 411.

It will be appreciated that such a governor is in effect a second spill valve in parallel with the manual throttle at 4 in Fig. 1.

It should be appreciated that function of the spill-controlled burner is a factor of importance in this system of control. The pump pressure will for any given engine speed (in the immediate application to gas turbine aero-engines) and at any height, remain constant within reasonably close limits, because the back-pressure caused by the swirl in the burner is a function not of the passage restriction (viscous resistance) of the burner, but of the velocity of supply into the vortex or swirl chamber. The output of the burner is found to be closely dependent on the spill pressure, and moreover it is found that the burner will continue to deliver good quality spray, with fine and uniform atomisation, even at very low rates of flow. To appreciate a reason for this it is only necessary for it to be pointed out that at the low delivery rate there is still a maximum rate of flow through the swirl chamber, but that most of the flow is being "spilled"; therefore the swirl velocity is being maintained. It is largely to this fact that the present described system owes its functional and practical advantages.

The fuel system above described has been operated satisfactorily with kerosene fuel oil, and like fuels, at idling pressures and maximum pressures of the respective orders of 30 lbs. sq. in. and 500 lbs. sq. in., with rates of flow in the burners varying substantially linearly with pressure. With suitable adaptation, there appears to be no reason why it should not operate with widely different pressures, but the devices as shown are intended primarily for employment in approximately this range.

We claim:

1. A fuel supply and control system for the continuous delivery of fuel for combustion comprising in combination a continuous discharge atomizing nozzle of the spill controlled type, pump means for supplying fuel under pressure to said nozzle, said pump means having a capacity in excess of the maximum atomized output required of said nozzle, a fuel supply conduit connecting said pump means and said nozzle, a spill return flow conduit from said nozzle, a resiliently loaded relief valve in said spill return flow conduit, the resilient load of which is varied to vary the rate of spill return flow, servo means acting on said resilient load to vary the loading thereof, manual actuating means actuating said servo means to vary the loading of said resiliently loaded relief valve and barometrically responsive automatic actuating means acting independently of said manual actuating means also actuating said servo means to vary the loading of said resilient loaded relief valve, thereby permitting the atomized discharge of said nozzle to be varied by modifying the balance between the supply and the spill return flow.

2. A fuel supply and control system for the continuous delivery of fuel for combustion comprising in combination a continuous discharge atomizing nozzle of the spill controlled type, pump means for supplying fuel under pressure to said nozzle, said pump means having a capacity in excess of the maximum atomized output required of said nozzle, a fuel supply conduit connecting said pump means and said nozzle, a spill return flow conduit from said nozzle, a resiliently loaded relief valve in said spill return flow conduit, the resilient load of which is varied to vary the rate of spill return flow, fluid operated servo piston sliding in a cylinder in a valve body of said relief valve for loading said resilient load of said relief valve operated by said pressure fuel, a servo valve also in said valve body for controlling the fluid acting on said piston, a follow-up connection between said servo valve and piston, a manual actuating means adapted to adjust said servo valve and a barometric capsule adapted independently of said manual actuating means also to adjust said servo valve, thereby permitting the atomized discharge of said nozzle to be varied by modifying the balance between the supply and spill return flow.

3. A fuel supply and control system as claimed in claim 2 wherein a conduit is provided from said spill return flow conduit to said servo valve and a reducing valve is provided therein to prevent said fuel pressure acting on said servo piston from exceeding a preselected value.

4. A fuel supply and control system as claimed in claim 3 wherein said conduit is provided with a safety valve.

5. A fuel supply and control system as claimed in claim 1 wherein said resiliently loaded relief valve is provided with resilient means opposing said resilient load to hold said relief valve open when the load on said relief valve is negligible.

6. A fuel supply and control system for an engine and delivering fuel for combustion comprising in combination a continuous discharge atomizing nozzle of the spill controlled type, a fuel pump driven by said engine for supplying fuel under pressure to said nozzle from a source, said pump having a capacity in excess of the maximum atomized output required of said nozzle, a conduit from said source to said pump, a fuel supply conduit connecting said pump and said nozzle, a spill return flow conduit from said nozzle, valve means in said spill return flow conduit operable to vary the rate of spill return flow, manual actuating means actuating said valve means to vary the rate of spill return flow, barometrically responsive automatic actuating means actuating said valve means independently of said manual actuating means also to vary the rate of spill return flow, thereby permitting the atomized discharge of said nozzle to be varied by modifying the balance between the supply and spill return flow, a drain connection from said supply conduit and a drain connection from said spill return flow conduit, and a valve positioned in said supply conduit adjacent said nozzle and arranged to interconnect said two drain conduits, said valve being resiliently loaded in opposition to said fuel pressure to a predetermined value and adapted to take up a position when said fuel pressure is at or above said value to connect said fuel supply to said nozzle and close said drain connections and to take up a position when said fuel pressure is below said value to cut off said fuel supply and connect said drains to said nozzle.

7. A fuel supply and control system for an engine and delivering fuel for combustion comprising in combination a continuous discharge atomizing nozzle of the spill controlled type, a fuel pump driven by said engine for supplying fuel under pressure to said nozzle from a source, said pump having a capacity in excess of the maximum atomized output required of said nozzle, a conduit from said source to said pump, a fuel supply conduit connecting said pump and said nozzle, a spill return flow conduit from said nozzle, valve means in said spill return flow conduit operable to vary the rate of spill return flow, manual actuating means actuating said means to vary the rate of spill return flow, barometrically responsive automatic actuating means actuating said valve means independently of said manual actuating means also to vary the rate of spill return flow, thereby permitting the atomized discharge of said nozzle to be varied by modifying the balance between the supply and spill return flow, and a pressure accumulator connected to said supply conduit between said pump and said nozzle.

8. A fuel supply and control system for an engine and delivering fuel for combustion comprising in combination a continuous discharge atomizing nozzle of the spill controlled type, a plural number of pumps for supplying fuel under pressure to said nozzle, said pumps having a capacity in excess of the maximum atomized output required of said nozzle, driving means for one of said plural number of pumps to drive it continuously during running of said engine, means for rendering another of said plural number of pumps effective for pumping during starting of said engine and ineffective for pumping during normal running of said engine, a fuel supply conduit connecting said plural number of pumps to said nozzle, a spill return flow conduit from said nozzle, valve means in said spill return flow conduit operable to vary the rate of spill return flow, manual actuating means actuating said valve to vary the rate of spill return flow, barometrically responsive automatic actuating means actuating said valve means independently of said manual actuating means also to vary the rate of spill return flow, thereby permitting the atomized discharge of said nozzle to be varied by modifying the balance between the supply and spill return flow.

9. A fuel supply and control system for an engine and delivering fuel for combustion comprising in combination a continuous discharge atomizing nozzle of the spill controlled type, a fuel pump driven by said engine for supplying fuel under pressure to said nozzle from a source, said pump having a capacity in excess of the maximum atomized output required of said nozzle, a conduit from said source to said pump, a fuel supply conduit connecting said pump and said nozzle, a spill return flow conduit from said nozzle, valve means in said spill return flow conduit operable to vary the rate of spill return flow, manual actuating means actuating said valve means to vary the rate of spill return flow, barometrically responsive automatic actuating means actuating said valve means independently of said manual actuating means also to vary the rate of spill return flow, thereby permitting the atomized discharge of said nozzle to be varied by modifying the balance between the supply and spill return flow, an additional fuel pump also driven by said engine and having a capacity in excess of the maximum atomized output required of said nozzle, suction and supply conduits for said additional pump to connect it in parallel with said first pump, non-return valves in the supply conduits of each pump, and a pressure operated change-over valve means connected appropriately between said supply conduits and said suction conduits so that when the fuel pressure is below a predetermined value both pumps operate in parallel and when the fuel pressure rises above said value, said additional pump is cut out while said first pump is capable of maintaining supply.

10. In a turbo machine including a turbine, means for continuously supplying a compressed working fluid thereto and liquid fuel combustion apparatus for heat energizing said working fluid prior to its entry into said turbine; a fuel supply and control system comprising a continuous discharge atomizing nozzle of the spill controlled type, supply and spill return flow conduits connected to said spill controlled atomizing nozzle, a turbine driven fuel pump having a capacity such that from idling speed to maximum speed of said turbine fuel is delivered through said supply conduit at a rate functionally related to turbine speed and at a rate exceeding the demand of said combustion apparatus; pressure relief valve means in said supply conduit to establish a datum pressure between said pump and said nozzle; flow adjusting valve means in said spill return flow conduit to modify the balance between said datum pressure supply and said spill return flow to permit the atomized discharge to be varied from a minimum to a maximum to cover the speed range of said turbine from idling speed to maximum speed; manual actuating means actuating said valve means to modify the balance between the datum pressure supply and spill return flow; barometric actuating means actuating said valve means independently of said manual actuating means also to modify the balance between the datum pressure supply and the spill return flow; a maximum speed governor operated valve in said spill return flow conduit to limit the maximum restriction in said spill return conduit to prevent overspeeding; and a stop cock in said datum pressure supply conduit to cut off said fuel supply from said nozzle to stop discharge from said nozzle.

11. In a turbo machine including a turbine, means for continuously supplying a compressed working fluid thereto and liquid fuel combustion apparatus for heat energizing said working fluid prior to its entry into said turbine; a fuel supply and control system for controlling the fuel to said combustion apparatus and thereby for controlling said turbine comprising a continuous discharge atomizing burner of the spill type having a fuel supply connection, a spill connection and a fuel atomizing discharge nozzle for discharging atomized fuel into said combustion apparatus, a supply conduit and a spill return conduit connected respectively to said supply and spill connections, a turbine driven fuel pump connected to said supply conduit for supplying fuel from a source to said atomizing nozzle, said pump having a fuel supplying capacity in excess of the maximum output required for said nozzle and being of the positive displacement type such that from idling speed to maximum speed fuel is delivered through said supply conduit at a rate functionally related to turbine speed, a relief by-pass connecting said supply conduit downstream of said pump to said source, a pressure relief valve in said by-pass to establish a datum fuel pressure between said pump and nozzle, fuel flow controlling means associated with at least one of said conduits to modify the balance of flow between the datum pressure fuel supply and the spill return conduits to permit said atomized discharge of fuel to be varied from a minimum to a maximum to cover the speed range of said turbine, and a stopcock in said supply conduit downstream of said by-pass to cut off said fuel from said nozzle.

12. In a turbo machine including a turbine, means for continuously supplying compressed working fluid thereto and liquid fuel combustion apparatus for heat energizing said working fluid prior to its entry into said turbine; a fuel supply and control system for controlling the fuel to said combustion apparatus and thereby for controlling said turbine comprising a continuous discharge burner of the spill type having a fuel supply connection, a spill connection and a fuel atomizing discharge nozzle for discharging atomized fuel into said combustion apparatus, a supply conduit and a spill return conduit connected respectively to said supply and spill connections, a turbine driven fuel pump connected to said spill conduit for supplying fuel from a source to said atomizing nozzle, said pump having a fuel supplying capacity in excess of the maximum output required of said nozzle and being of the positive displacement type such that from idling speed to maximum speed fuel is delivered through said supply conduit at a rate functionally related to turbine speed, a relief by-pass connecting said supply conduit downstream of said pump to said source, a pressure relief valve in said by-pass to establish a datum fuel pressure between said pump and nozzle, fuel flow controlling means associated with at least one of said conduits to modify the balance of flow between the datum pressure supply and spill return conduits to permit said atomized discharge of fuel to be varied from a minimum to a maximum to cover the speed range of said turbine, a manual actuating means acting on said fuel flow controlling means to modify said balance of flow, automatic actuating means functioning in accordance with at least one physical quantity associated with said turbine machine acting on said fuel flow controlling means independently of said manual means also to modify said balance of flow, and a stopcock in said datum pressure supply conduit to cut off said fuel from said nozzle.

GEOFFREY BERTRAM ROBERT FEILDEN.
ARCHIE SIMONS.
RAYMOND HOLL.

REFERENCES CITED

The following references are of record in the file of this patent:

UNITED STATES PATENTS

| Number | Name | Date |
|---|---|---|
| 1,612,596 | Marks | Dec. 28, 1926 |
| 1,628,424 | Peabody | May 10, 1927 |
| 1,696,196 | Gray | Dec. 25, 1928 |
| 1,824,952 | Graham et al. | Sept. 29, 1931 |
| 1,900,385 | Kahr | Mar. 7, 1933 |
| 1,906,334 | Rathbun | May 2, 1933 |
| 1,980,478 | Frentzel | Nov. 13, 1934 |
| 1,985,279 | Buller | Dec. 25, 1934 |
| 2,100,997 | Russel | Nov. 30, 1937 |
| 2,178,672 | Perkins | Nov. 7, 1939 |
| 2,263,913 | Bargeboer | Nov. 25, 1941 |
| 2,290,350 | Olches | July 21, 1942 |
| 2,334,679 | Mason et al. | Nov. 16, 1943 |
| 2,368,164 | Schumann et al. | Jan. 30, 1945 |
| 2,412,289 | Pugh et al. | Dec. 10, 1946 |

FOREIGN PATENTS

| Number | Country | Date |
|---|---|---|
| 526,998 | Great Britain | Sept. 30, 1940 |